(12) United States Patent
Yano

(10) Patent No.: US 6,246,748 B1
(45) Date of Patent: Jun. 12, 2001

(54) POWER FEEDING SYSTEM USING TWO-WIRE SUBSCRIBER LINES

(75) Inventor: Yasuji Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/133,783

(22) Filed: Aug. 12, 1998

(30) Foreign Application Priority Data

Aug. 15, 1997 (JP) .................................................. 9-235351

(51) Int. Cl.[7] .............................. H04M 3/30; H04M 3/32
(52) U.S. Cl. .................................. 379/2; 379/399; 379/412; 379/413
(58) Field of Search ............................... 379/413, 22, 24, 379/26, 27, 28, 29, 30, 2, 412, 5, 6, 399; 375/258, 224; 370/249

(56) References Cited

U.S. PATENT DOCUMENTS

| | | | |
|---|---|---|---|
| 5,175,764 | * 12/1992 | Patel et al. | 379/412 |
| 5,420,886 | * 5/1995 | Ohmori | 375/258 |
| 5,442,697 | * 8/1995 | McGary et al. | 379/399 |
| 5,544,243 | * 8/1996 | Papadopoulos | 379/413 |
| 5,661,776 | * 8/1997 | Charland | 379/2 |
| 5,832,058 | * 11/1998 | Walance et al. | 379/22 |
| 5,848,127 | * 12/1998 | Levitan et al. | 379/5 |

FOREIGN PATENT DOCUMENTS

03272254 * 12/1991 (JP) .
8-251819 9/1996 (JP) .

* cited by examiner

Primary Examiner—William R. Korzuch
Assistant Examiner—Susan Wieland
(74) Attorney, Agent, or Firm—Ostrolenk, Faber, Gerb & Soffen, LLP

(57) ABSTRACT

A power feeding system includes a line state detector for detecting an operation state of each of a pair of 2-wire subscriber lines connected to the exchange equipment and a transformer for supplying the DC power to the subscriber terminal through each of the pair of 2-wire subscriber lines connected to the subscriber terminal. When the detector detects a subscriber line test state, a switch circuit detaches the transformer from each of the pair of 2-wire subscriber lines and directly connecting the exchange equipment to the subscriber terminal through each of the pair of 2-wire subscriber lines.

24 Claims, 3 Drawing Sheets

VOLTAGE
BETWEEN
L1A AND L1B
(L2A AND L2B)    −48V

SWITCH CONTROL
SIGNAL S_SW
(OF FIG.2)

SWITCH CONTROL
SIGNAL S_SW
(OF FIG.3)

POWER FEEDING SYSTEM USING TWO-WIRE SUBSCRIBER LINES

BACKGROUND OF THE INVENTION

1. Field of the Invention

The present invention generally relates to a system for feeding electric power to a terminal using a subscriber line, and in particular to a system having a power feeding circuit provided between exchange or switch equipment and the terminal.

2. Description of the Related Art

According to recommendations defined by ITU-T (ITU-Telecommunication Standardization Sector), ISDN exchange or switch equipment is equipped with an optional means for feeding power to network termination equipment through a subscriber line. Therefore, there are cases where the ISDN exchange equipment is not equipped with the power feeding means. To supply power from the side of the ISDN exchange equipment without a power feeding facility to the network termination equipment, there has been proposed a system having a power feeding adapter connected between the ISDN exchange equipment and the network termination equipment in Japanese Patent Unexamined Publication No. 8-251819.

More specifically, the ISDN exchange equipment is provided with a plurality of line termination circuits and the network termination equipment is provided with two network termination FQ5-331 2 circuits each corresponding to a different line termination circuit. The power feeding adapter is provided with first and second transformers which connect the two network termination circuits of the network termination equipment and the corresponding line termination circuits of the ISDN exchange equipment through a pair of 2-wire subscriber lines, respectively.

The power feeding adapter is further provided with a DC power source where the one output terminal of the DC power source is connected to the center tap of the secondary winding of the first transformer and the other output terminal of the DC power source is connected to the center tap of the secondary winding of the second transformer. The DC power is transferred to the network termination equipment through the pair of two 2-wire subscriber lines.

According to the above conventional system, however, a problem comes up in association with a subscriber line test which is an important function of the line termination circuit or subscriber line interface circuit. The subscriber line test is performed to measure various physical quantities including line resistance and capacitance between subscriber lines in a state where the subscriber line interface circuits are directly connected to the subscriber lines.

Therefore, in the case of the above conventional system, it is necessary to isolate the power feeding adapter from the subscriber lines when the subscriber line test is started and to connect it to the subscriber lines again when the subscriber line test has been completed. To achieve such a switching operation, the power feeding adapter needs to receive test starting and test completion signals from the exchange or switch equipment. However, such test starting and test completion signals are not provided in the case of the exchange equipment without a power feeding facility. In other words, to perform the subscriber line test, each subscriber line interface circuit needs to be provided with an additional circuit for generating the test starting and test completion signals, resulting in increased amount of hardware and complicated circuit configuration.

SUMMARY OF THE INVENTION

An object of the present invention is to provide a power feeding system and method which can perform the subscriber line test using existing exchange equipment without the need of additional circuits other than power feeding equipment.

According to the present invention, a power feeding system for feeding direct-current (DC) power to a subscriber terminal using a pair of 2-wire subscriber lines of exchange equipment, is comprised of a detector for detecting an operation state of each of the pair of 2-wire subscriber lines connected to the exchange equipment and a power supply circuit for supplying the DC power to the subscriber terminal through the pair of 2-wire subscriber lines connected to the subscriber terminal. When the detector detects that the operation state is a subscriber line test state, a switch circuit detaches the power supply from the pair of 2-wire subscriber lines and directly connects the exchange equipment to the subscriber terminal through the pair of 2-wire subscriber lines.

The detector may detect a voltage on each of the pair of 2-wire subscriber lines connected to the exchange equipment to determine whether the operation state is the subscriber line test state. Alternatively, the detector may detects an alternating-current component on each of the pair of 2-wire subscriber lines connected to exchange equipment to determine whether the operation state is the subscriber line test state, wherein the alternating-current component is applied to each of the pair of 2-wire subscriber lines by the exchange equipment in only a communication state.

As described above, when the subscriber line test state is detected, the power supply circuit is detached from the subscriber lines and the exchange equipment is directly connected to the subscriber terminal through the subscriber lines. Therefore, the subscriber line test can be easily and automatically performed. After the subscriber line test has been completed, the detector detects a normal communication state and the power supply circuit restarts supplying the DC power to the subscriber terminal through the subscriber lines.

DETAILED DESCRIPTION OF THE PREFERRED EMBODIMENTS

Figure 1:
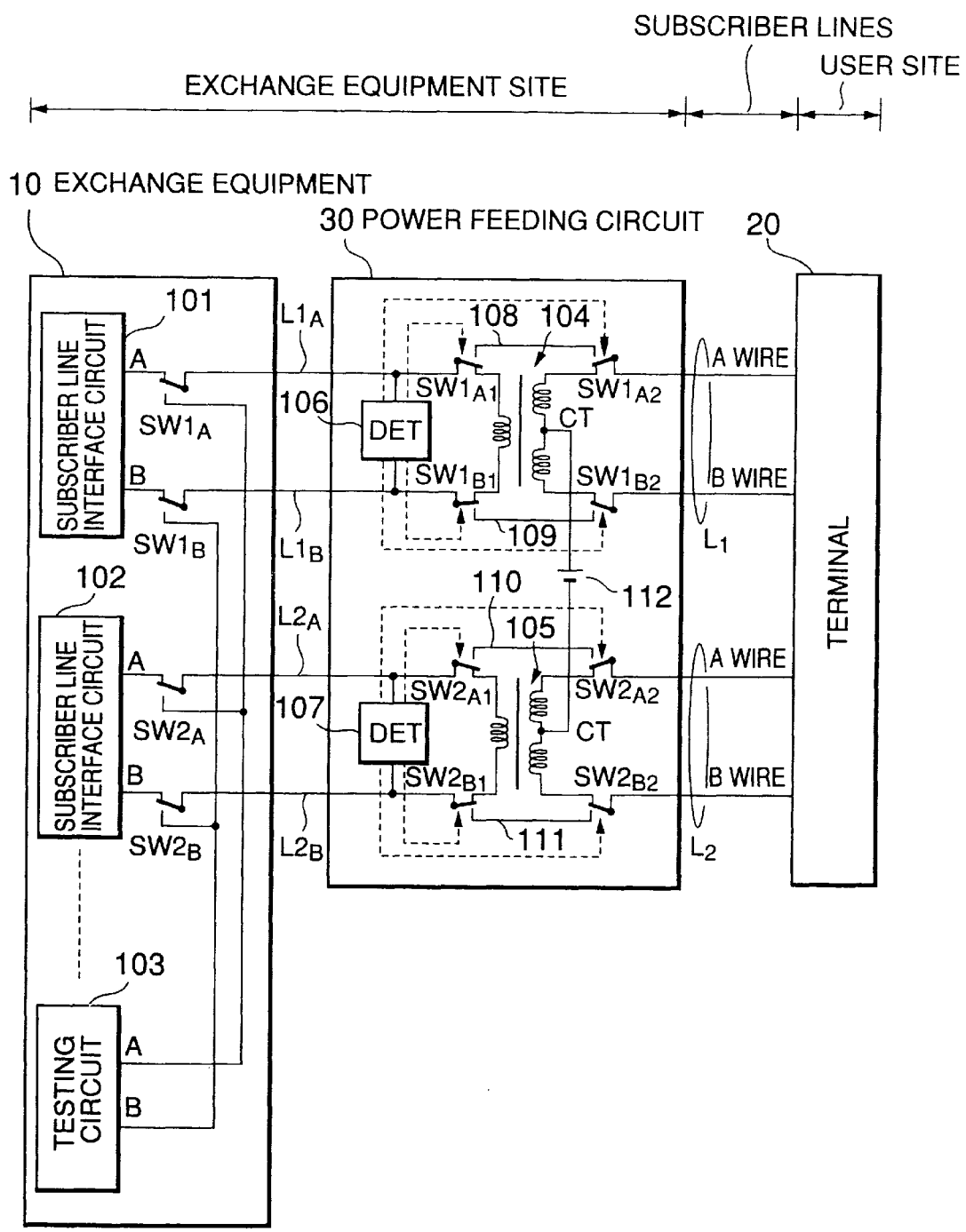
FIG. 1 is a block diagram showing a power feeding circuit provided between exchange equipment site and terminal site according to an embodiment of the present invention.

Referring to FIG. 1, exchange equipment 10 is connected to a terminal 20 through a power feeding circuit 30 which supplies DC power to the network termination equipment of the terminal 20 through a pair of 2-wire subscriber lines $L_1$ and $L_2$ each including A wire and B wire The exchange equipment 10 accommodates a plurality of 2-wire subscriber lines including the pair of 2-wire subscriber lines $L_1$ and $L_2$. The exchange equipment 10 is comprised of a testing facility and a plurality of subscriber line interface circuits which correspond to the 2-wire subscriber lines $L_1, L_2, \ldots$, respectively. Among the subscriber line interface circuits, two of the subscriber line interface circuits 101 and 102 are shown connected to the power feeding circuit 30 which supplies the DC power to the terminal 20 through the pair of 2-wire subscriber lines $L_1$ and $L_2$.

More specifically, the A and B terminals of the subscriber line interface circuit 101 are connected to switches $SW1_A$ and $SWL_B$ which are in turn connected to wires $L1_A$ and $L1_B$, respectively. The wires $L1_A$ and $L1_B$ correspond to the A and B wires of the 2-wire subscriber lines $L_1$. Similarly, the two terminals of the subscriber line interface circuit 102 are connected to switches $SW2_A$ and $SW2_B$ which are in turn connected to wires $L2_A$ and $L2_B$, respectively. The wires $L2_A$ and $L2_B$ correspond to the A and B wires of the 2-wire subscriber lines $L_2$.

The switches $SW1_A$ and $SW1_B$ concurrently perform the same switch operation such that the testing circuit 103 is selected when the subscriber line test is started under control of an exchange controller (not shown). The switch $SW1_A$ connects the wire $L1_A$ to a selected one of the A terminal of the subscriber line interface circuit 101 and the A terminal of the testing circuit 103. The switch $SW1_B$ connects the wire $L1_B$ to a selected one of the B terminal of the subscriber line interface circuit 101 and the B terminal of the testing circuit 103. Similarly, The switches $SW1_A$ and $SW1_B$ concurrently perform the same switch operation such that the testing circuit 103 is selected when the subscriber line test is started under control of the exchange controller. The switch $SW2_A$ connects the wire $L2_A$ to a selected one of the A terminal of the subscriber line interface circuit 102 and the A terminal of the testing circuit 103. The switch $SW2_B$ connects the wire $L2_B$ to a selected one of the B terminal of the subscriber line interface circuit 102 and the B terminal of the testing circuit 103.

The power feeding circuit 30 is comprised of transformers 104 and 105 which have primary windings connected to line state detectors 106 and 107, respectively, and a secondary winding connected to the terminal 20 through the 2-wire subscriber lines $L_1$ and $L_2$.

More specifically, the wires $L1_A$ and $L1_B$ are connected to the input terminals of the line state detector 106 and further to the A and B terminals of the primary winding of the transformer 104 through switches $SW1_{A1}$ and $SW1_{B1}$, respectively. The switch $SW1_{A1}$ connects the wire $L1_A$ to a selected one of the A terminal of the primary winding of the transformer 104 and an interconnection wire 108. The switch $SW1_{B1}$ connects the wire $L1_B$ to a selected one of the B terminal of the primary winding of the transformer 104 and an interconnection wire 109. The interconnection wire 108 and the A terminal of the secondary winding of the transformer 104 are connected to the A wire of the 2-wire subscriber line $L_1$ through a switch $SW1_{A2}$ and the interconnection wire 109 and the B terminal of the secondary winding of the transformer 104 are connected to the B wire of the 2-wire subscriber line $L_1$ through a switch $SW1_{B2}$. The switch $SW1_{A2}$ connects the A wire of the subscriber line $L_1$ to a selected one of the A terminal of the secondary winding of the transformer 104 and the interconnection wire 108. The switch $SW1_{B2}$ connects the B wire of the subscriber line $L_1$ to a selected one of the B terminal of the secondary winding of the transformer 104 and the interconnection wire 109.

The switches $SW1_{A1}$, $SW1_{B1}$, $SW1_{A2}$, and $SW1_{B2}$ concurrently perform the same operation depending on the output of the line state detector 106. More specifically, when the wires $L1_A$ and $L1_B$ are in a communication state, the line state detector 106 outputs a communication detection signal as switch control signal to the switches $SW1_{A1}$, $SW1_{B1}$, $SW1_{A2}$, and $SW1_{B2}$. The communication detection signal causes the switches $SW1_{A1}$, $SW1_{B1}$, $SW1_{A2}$, and $SW1_{B2}$ to be in a normal state where the switches connect the transformer 104 to the wires $L1_A$ and $L1_B$ and the A and B wires of the subscriber line $L_1$.

On the other hand, when the test is started by the switches $SW1_A$ and $SW1_B$ concurrently selecting the test circuit 103, the wires $L1_A$ and $L1_B$ are changed into a test state and thereby the line state detector 106 outputs a test detection signal as switch control signal to the switches $SW1_{A1}$, $SW1_{B1}$, $SW1_{A2}$, and $SW1_{B2}$. The test detection signal causes the switches $SW1_{A1}$, $SW1_{B1}$, $SW1_{A2}$, and $SW1_{B2}$ to be in a test switch state where all the switches select the interconnection wires 108 and 109 to connect the wires $L1_A$ and $L1_B$ directly to the A and B wires of the subscriber line $L_1$. In other words, an alternative path or a detour around the transformer 104 is formed in the power feeding circuit 30.

Similarly, the wires $L2_A$ and $L2_B$ are connected to the input terminals of the line state detector 107 and further to the A and B terminals of the primary winding of the transformer 105 through switches $SW2_{A1}$ and $SW2_{B1}$, respectively. The switch $SW2_{A1}$ connects the wire $L2_A$ to a selected one of the A terminal of the primary winding of the transformer 105 and an interconnection wire 110. The switch $SW2_{B1}$ connects the wire $L2_B$ to a selected one of the B terminal of the primary winding of the transformer 105 and an interconnection wire 111. The interconnection wire 110 and the A terminal of the secondary winding of the transformer 105 are connected to the A wire of the 2-wire subscriber line $L_2$ through a switch $SW2_{A2}$ and the interconnection wire 111 and the B terminal of the secondary winding of the transformer 105 are connected to the B wire of the 2-wire subscriber line $L_2$ through a switch $SW2_{B2}$. The switch $SW2_{A2}$ connects the A wire of the subscriber line $L_2$ to a selected one of the A terminal of the secondary winding of the transformer 105 and the interconnection wire 110. The switch $SW2_{B2}$ connects the B wire of the subscriber line $L_2$ to a selected one of the B terminal of the secondary winding of the transformer 105 and the interconnection wire 111.

The switches $SW2_{A1}$, $SW2_{B1}$, $SW2_{A2}$, and $SW2_{B2}$ concurrently perform the same operation depending on the output of the line state detector 107. More specifically, when the wires $L2_A$ and $L2_B$ are in a communication state, the line state detector 107 outputs a communication detection signal as switch control signal to the switches $SW2_{A1}$, $SW2_{B1}$, $SW2_{A2}$, and $SW2_{B2}$. The communicationdetection signal causes the switches $SW2_{A1}$, $SW2_{B1}$, $SW2_{A2}$, and $SW2_{B2}$ to be in a normal switch state where the switches connect the transformer 105 to the wires $L2_A$ and $L2_B$ and the A and B wires of the subscriber line $L_2$.

On the other hand, when the test is started by the switches $SW1_A$ and $SW1_B$ concurrently selecting the test circuit 103, the wires $L2_A$ and $L2_B$ are changed into a test state and thereby the line state detector 107 outputs a test detection signal as switch control signal to the switches $SW2_{A1}$, $SW2_{B1}$, $SW2_{A2}$, and $SW2_{B2}$. The test detection signal causes the switches $SW2_{A1}$, $SW2_{B1}$, $SW2_{A2}$, and $SW2_{B2}$ to be in a test switch state where all the switches select the interconnection wires 110 and 111 to connect the wires $L2_A$ and $L2_B$ directly to the A and B wires of the subscriber line $L_2$. In other words, an alternative path or a detour around the transformer 105 is formed in the power feeding circuit 30.

The respective transformers 104 and 105 have center taps CT in the secondary windings thereof. The power feeding circuit 30 is further provided with a DC source 112 whose positive and negative electrodes are connected to the center taps of the transformers 104 and 105, respectively.

As described above, in the case of the communication state, the power feeding circuit 30 connects the wires $L1_A$ and $L1_B$ to the A and B wires of the subscriber line $L_1$ through the transformer 104 and connects the wires $L2_A$ and $L2_B$ to the A and B wires of the subscriber line $L_2$ through the transformer 105. Therefore, communication signals are transferred between the exchange equipment 10 and the terminal 20 through the transformers 104 and 105 and the DC power is supplied from the DC source 112 to the terminal 20 through the secondary windings of the transformers 104 and 105 and the subscriber lines $L_1$ and $L_2$. In this case, the current flows through the subscriber lines $L_1$ from the transformer 104 to the terminal 20 and through the subscriber lines $L_2$ from the terminal 20 to the transformer 104.

At the terminal 20, the A and B wires of the subscriber line $L_1$ are connected to a receive-side transformer (not shown) and the DC power is extracted from the center tap of the receive-side transformer. It is the same with the subscriber line $L_2$. Since the current flows through each of the subscriber lines $L_1$ and $L_2$ in the same direction, the inductance is prevented from saturation at the transformers 104 and 105 of the power feeding circuit 30 and the receive-side transformers of the terminal 20.

In the case of the test state, the power feeding circuit 30 connects the wires $L1_A$ and $L1_B$ directly to the A and B wires of the subscriber line $L_1$ and connects the wires $L2_A$ and $L2_B$ directly to the A and B wires of the subscriber line $L_2$. Therefore, the DC power supplying is stopped and only the test signal is transferred from the test circuit 103 directly to the terminal 20 through the subscriber lines $L_1$ and $L_2$.

Line State Detector

Figure 2:
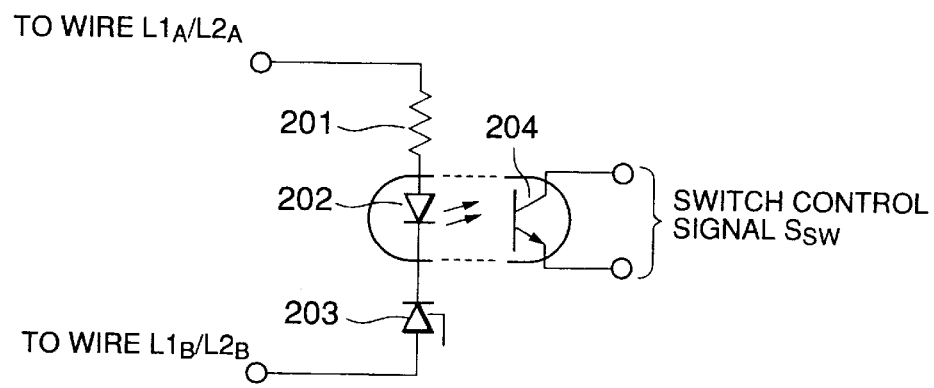
FIG. 2 is a circuit diagram showing an example of a signal detector provided in the power feeding circuit.

Referring to FIG. 2, a line state detector (106, 107) is designed to detect a change of voltage across the wires $L1_A$ and $L1_B$ or the wires $L2_A$ and $L2_B$. In the communication state, the subscriber line interface circuits applies a predetermined constant voltage to the wires $L1_A$ and $L1_B$ and the wires $L2_A$ and $L2_B$ to generate a sealing current. In the test state, the voltage on the wires $L1_A$ and $L1_B$ and the wires $L2_A$ and $L2_B$ is changed to the ground level.

Taking the line state detector 106 as an example, the wires $L1_A$ and $L1_B$ are connected across a circuit having a resistor 201, a light-emitting diode 202 of a photo coupler and a Zener diode 203 connected in series. The light-emitting diode 202 forms the photo coupler with a phototransistor 204. The Zener diode 203 is selected so that the Zener breakdown voltage is smaller than the predetermined constant voltage applied to the wires $L1_A$ and $L1_B$ by the subscriber line interface circuit 101. Therefore, in the communication state, a current flows through the light-emitting diode 202 to cause it to emit light to the phototransistor 204. When the phototransistor 204 receives the light from the diode 202, a current flows through the phototransistor 204 and is amplified to set the switches $SW1_{A1}$, $SW1_{B1}$, $SW1_{A1}$, and $SW1_{B2}$ to the normal switch state such that the switches connect the transformer 104 to the wires $L1_A$ and $L1_B$ and the A and B wires of the subscriber line $L_1$.

When the test is started by the switches $SW1_A$ and $SW1_B$ concurrently selecting the test circuit 103, the voltage on the wires $L1_A$ and $L1_B$ are changed to the ground level. Therefore, the Zener diode 203 stops the current flowing, causing the light-emitting diode 202 to be turned off. Since no current flows through the phototransistor 204, the switches $SW1_{A1}$, $SW1_{B1}$, $SW1_{A2}$, and $SW1_{B2}$ are changed to the test switch state where all the switches select the interconnection wires 110 and 111 to connect the wires $L1_A$ and $L1_B$ directly to the A and B wires of the subscriber line $L_1$.

In this manner, the line state detector 106 automatically detects the operation state of the exchange equipment 10 and the switches $SW1_{A1}$, $SW1_{B1}$, $SW1_{A2}$, and $SW1_{B2}$ are controlled depending on the detected state. It is the same with the line state detector 107.

Figure 3:
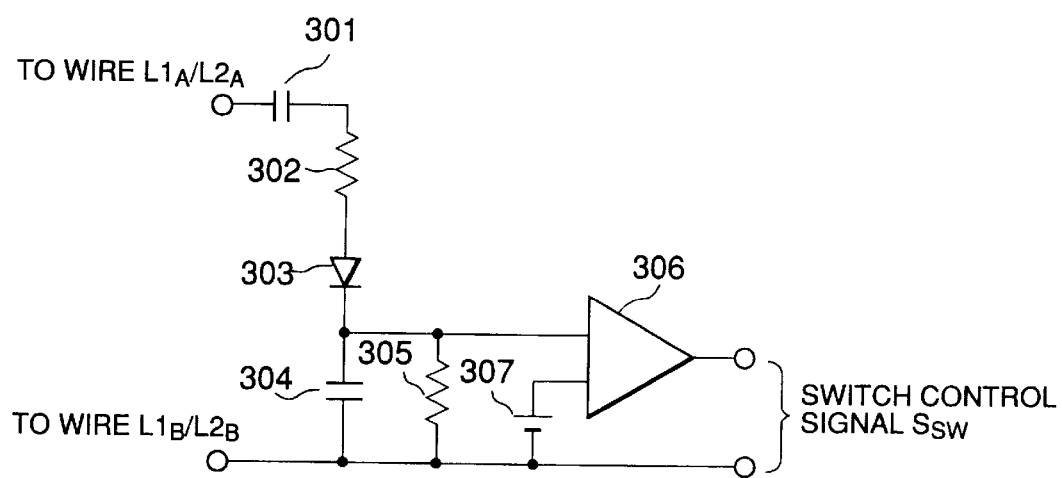
FIG. 3 is a circuit diagram showing another example of a signal detector provided in the power feeding circuit.

Referring to FIG. 3, a line state detector (106, 107) is designed to detect an AC signal transmitted only during communication through the wires $L1_A$ and $L1_B$ or the wires $L2_A$ and $L2_B$. Such an AC signal may be a 2B1Q code signal. Therefore, the operation state of the exchange equipment 10 can be detected depending on whether the AC signal is detected.

Taking the line state detector 106 as an example, it is comprised of a capacitor 301, a rectifying circuit comprising a resistor 302, a diode 303, a capacitor 304 and a resistor 305, and a comparator 306.

When receiving the AC signal superposed on the predetermined constant voltage, only the AC signal passes through the capacitor 301 and then is rectified by the diode 303. The output of the diode 303 is smoothed by the smoothing circuit comprising the capacitor 304 and the resistor 305. In other words, the amplitude level of the AC signal is detected and output to the comparator 306. The comparator 306 compares the received amplitude level of the AC signal to a predetermined reference voltage 307.

When the received amplitude level of the AC signal is greater than the predetermined reference voltage 307 in the communication state, the comparator 306 outputs the communication detection signal to the switches $SW1_{A1}$, $SW1_{B1}$, $SW1_{A2}$, and $SW1_{B2}$. Therefore, the switches $SW1_{A1}$, $SW1_{B1}$, $SW1_{A2}$, and $SW1_{B2}$ are set to the normal switch state such that the switches connect the transformer 104 to the wires $L1_A$ and $L1_B$ and the A and B wires of the subscriber line $L_1$.

When the received amplitude level of the AC signal is not greater than the predetermined reference voltage 307 in the test state, the comparator 306 outputs the test detection signal to the switches $SW1_{A1}$, $SW1_{B1}$, $SW1_{A2}$, and $SW1_{B2}$. Therefore, the switches $SW1_{A1}$, $SW1_{B1}$, $SW1_{A2}$, and $SW1_{B2}$ are changed to the test switch state where all the switches select the interconnection wires 110 and 111 to connect the wires $L1_A$ and $L1_B$ directly to the A and B wires of the subscriber line $L_1$. It is the same with the line state detector 107.

The line state detector as shown in FIG. 3 can be useful in the case where the testing circuit 103 outputs the same voltage as the predetermined constant voltage because it does not detect the DC voltage but AC signal.

Figure 4A:
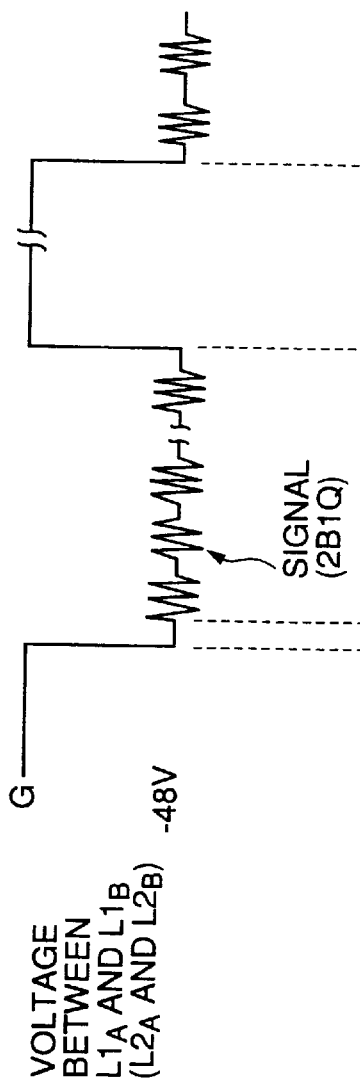
FIG. 4A is a diagram showing a waveform of a voltage appearing on 2-wire subscriber line of the exchange equipment.

Referring to FIG. 4A, in the communication state, the subscriber line interface circuits applies a predetermined constant voltage of −48V to the wires $L1_A$ and $L1_B$ and the wires $L2_A$ and $L2_B$. In the test state, the voltage on the wires $L1_A$ and $L1_B$ and the wires $L2_A$ and $L2_B$ is changed to the ground level G. Further, the 2B1Q code signal is superimposed on the predetermined constant voltage of −48V during only communication.

Figure 4B:
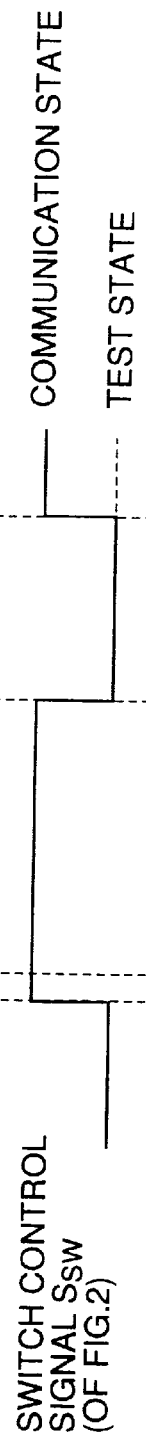
FIG. 4B is a diagram showing a waveform of a detection signal of the signal detector as shown in FIG. 2.
Figure 4C:
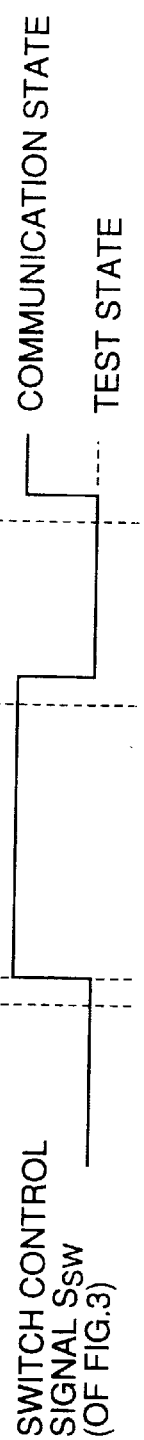
FIG. 4C is a diagram showing a waveform of a detection signal of the signal detector as shown in Fig. 3.

As shown in FIG. 4B, the line state detector of FIG. 2 produces the switch control signal changing in amplitude depending on whether the Zener breakdown of the Zener diode 203 occurs.

As shown in FIG. 4B, the line state detector of FIG. 3 produces the switch control signal changing in amplitude depending on the 2B1Q code signal is detected. There is a delay time from a change of the predetermined constant voltage to a change of the switch control signal. However, such a delay time is negligible in the exchange operation. Further, in the line state detector as shown in FIG. 3, it is important to increase the input impedance not to reduce in signal level, that is, to maintain the quality of communication.

A combination of the line state detectors of FIGS. 2 and 3 may be useful. For example, the respective input terminals of the first line state detector of FIG. 2 and the second line state detector of FIG. 3 are connected in common and the output terminals are connected to an OR gate. In this case, when one of the first and second line state detectors detects the test state, the switches are changed to the test switch state as described before. When one of the first and second line state detectors detects the normal communication state, the switches are changed to the normal switch state. In other words, using the combination of the line state detectors of FIGS. 2 and 3, the power feeding system can be used for various types of exchange equipment.

As described above, according to the present invention, the line state detector (106, 107) detects the operation state of the exchange equipment 10 by monitoring the subscriber lines of the exchange equipment 10. In other words, the line state detector determines which of the normal communication and the subscriber line test is performed. When the subscriber line test is detected, the transformer (104, 105) for dc power supplying is detached or isolated from the subscriber lines and the exchange equipment is directly connected to the terminal 20. After the subscriber line test has been done, the transformer is connected to the subscriber lines to feed dc power to the terminal. Therefore, the existing exchange equipment can be used in the power feeding system according to the present invention. In this manner, the subscriber line test can be easily and automatically performed in the power feeding system using the power feeding circuit 30.

What is claimed is:

1. A power feeding system for feeding D.C. power to a subscriber terminal using a pair of 2-wire subscriber lines of exchange equipment, the power feeding system comprising:
    a detector for detecting the operation state of each of the pair of 2-wire subscriber lines connected to the exchange equipment;
    a power supply circuit located between the exchange equipment and the subscriber terminal for supplying the D.C. power to the subscriber terminal through the pair of 2-wire subscriber lines connected to the subscriber terminal; and
    a switch circuit for connecting the power supply to the pair of 2-wire subscriber lines when the detector detects that the subscriber lines are in a communication state, and for detaching the power supply from the pair of 2-wire subscriber lines while leaving the exchange equipment connected to the subscriber terminal through the pair of two-wire subscriber lines when the detector detects that the operation state is a subscriber line test state.

2. The power feeding system according to claim 1, wherein the detector detects a voltage between the two wires of each of the pair of 2-wire subscriber lines connected to the exchange equipment to determine whether the operation state is the subscriber line test state.

3. The power feeding system according to claim 1, wherein the detector detects an alternating-current component on each of the pair of 2-wire subscriber lines connected to the exchange equipment to determine whether the operation state is the subscriber line test state, wherein the alternating-current component is applied to each of the pair of 2-wire subscriber lines by the exchange equipment in only a communication state.

4. The power feeding system according to claim 1, wherein the detector comprises:
    a first detector for detecting a voltage between the two wires of each of the pair of 2-wire subscriber lines connected to the exchange equipment to produce a first test state detection signal;
    a second detector for detecting an alternating-current component on each of the pair of 2-wire subscriber lines connected to exchange equipment to produce a second test state detection signal, wherein the alternating-current component is applied to each of the pair of 2-wire subscriber lines by the exchange equipment in only a communication state; and
    a combiner for combining the first and second test state detection signals to produce a switch control signal.

5. The power feeding system according to claim 1, wherein the power supply circuit comprises:
    first and second transformers for the first and second 2-wire subscriber lines, respectively, the first transformer having a first winding and a second winding which are detachably connected to the exchange equipment and the subscriber terminal, respectively, the second transformer having a third winding and a fourth winding which are detachably connected to the exchange equipment and the subscriber terminal, respectively, wherein the second and fourth windings having first and second center taps, respectively; and
    a DC power source connected to the first and second center taps, and
    the switch circuit comprises first and second switch circuits for the first and second transformers, respectively, wherein
        the first switch circuit detaches the first transformer from the first 2-wire subscriber line and directly connecting the exchange equipment to the subscriber terminal through the first 2-wire subscriber line when the detector detects the subscriber line test state from the first 2-wire subscriber line; and
        the second switch circuit detaches the second transformer from the second 2-wire subscriber line and directly connects the exchange equipment to the subscriber terminal through the second 2-wire subscriber line when the detector detects the subscriber line test state from the second 2-wire subscriber line.

6. The power feeding system according to claim 1, wherein:
    the detector comprises a first detection circuit connected to one of the 2-wire subscriber lines and a second detection circuit connected to the other of the 2-wire subscriber lines, each detection circuit being responsive to the connected 2-wire subscriber line being in the test state to generate a control signal; and wherein
    the switch circuit comprises a first switch which connects the power supply circuit to one of the 2-wire subscriber lines and a second switch which connects the power supply circuit to the other of the 2-wire subscriber lines;

the first switch being responsive to the control signal generated by the first detection circuit to disconnect the power supply circuit from the first 2-wire subscriber line, and the second switch being responsive to the control signal generated by the second detection circuit to disconnect the power supply circuit from the second 2-wire subscriber line.

7. The power feeding system according to claim 6, wherein alternating-current signals are applied to the subscriber lines by the exchange equipment only in the communication state; and wherein the detector detects the absence of the alternating-current signals to determine that the operation state of the subscriber line is the test state.

8. A system for transferring communication signals between exchange equipment and a subscriber terminal using a first 2-wire subscriber line and feeding direct-current (DC) power to the subscriber terminal using a pair of the first 2-wire subscriber line and a second 2-wire subscriber line, comprising:

a detector for detecting an operation state of the pair of 2-wire subscriber lines connected to the exchange equipment to determine whether the operation state is a subscriber line test state;

first and second transformers for the first and second 2-wire subscriber lines, respectively, each of the transformer having a first winding and a second winding, wherein the DC power is applied to center taps of second windings of the first and second transformers; and first and second switch circuits for the first and second transformers, respectively, wherein the first switch circuit detaches the first transformer from the first 2-wire subscriber line and directly connecting the exchange equipment to the subscriber terminal through the first 2-wire subscriber line and the second switch circuit detaches the second transformer from the second 2-wire subscriber line and directly connecting the exchange equipment to the subscriber terminal through the second 2-wire subscriber line when the detector detects the subscriber line test state.

9. The system according to claim 8, wherein the detector comprises:

a first detector for detecting a voltage between the two wires of each of the pair of 2-wire subscriber lines connected to the exchange equipment to produce a first test state detection signal;

a second detector for detecting an alternating-current component on each of the pair of 2-wire subscriber lines connected to exchange equipment to produce a second test state detection signal, wherein the alternating-current component is applied to each of the pair of 2-wire subscriber lines by the exchange equipment in only a communication state; and a combiner for combining the first and second test state detection signals to produce a switch control signal.

10. The system according to claim 8, wherein the detector detects a voltage between the two wires of each of the pair of 2-wire subscriber lines connected to the exchange equipment to determine whether the operation state is the subscriber line test state.

11. The system according to claim 8, wherein the detector detects an alternating-current component on each of the pair of 2-wire subscriber lines connected to exchange equipment to determine whether the operation state is the subscriber line test state, wherein the alternating-current component is applied to each of the pair of 2-wire subscriber lines by the exchange equipment in only a communication state.

12. A control method for a power feeding circuit which feeds power to a subscriber terminal using a pair of 2-wire subscriber lines of exchange equipment, the control method comprising the steps of:

a) detecting an operation state of each of the pair of 2-wire subscriber lines connected to the exchange equipment;

b) supplying the DC power to the subscriber terminal through the pair of 2-wire subscriber lines connected to the subscriber terminal from a power supply circuit located between the exchange equipment and the subscriber terminal when the operation state is a communication state; and c) detaching the power supply from the pair of 2-wire subscriber lines while leaving the exchange equipment connected to the subscriber terminal through the pair of 2-wire subscriber lines when the operation state is a subscriber line test state.

13. The control method according to claim 12, wherein the step a) comprises:

detecting a voltage between the two wires of each of the pair of 2-wire subscriber lines connected to the exchange equipment to produce a first test state detection signal;

detecting an alternating-current component on each of the pair of 2-wire subscriber lines connected to the exchange equipment to produce a second test state detection signal, wherein the alternating-current component is applied to each of the pair of 2-wire subscriber lines by the exchange equipment in only a communication state; and combining the first and second test state detection signals to determine whether the operation state is the subscriber line test state.

14. The control method according to claim 12, wherein the operation state is detected by monitoring a voltage between the two wires of each of the pair of 2-wire subscriber lines connected to the exchange equipment.

15. The control method according to claim 12, wherein the operation state is detected by monitoring an alternating-current component on each of the pair of 2-wire subscriber lines connected to exchange equipment to determine whether the operation state is the subscriber line test state, wherein the alternating-current component is applied to each of the pair of 2-wire subscriber lines by the exchange equipment in only a communication state.

16. A power feeding system for feeding D.C. power to a subscriber terminal in a communication system in which the subscriber terminal is connected to an exchange by a subscriber line, the power feeding system comprising:

a power supply circuit located between the exchange equipment and the subscriber terminal;

a detector for detecting the operation state of the subscriber line; and a switch circuit for connecting the power supply to the subscriber line when the operating state of the communication system is a communication state, and for disconnecting the power supply from the subscriber line while leaving the exchange equipment connected to the subscriber terminal through the subscriber line when the detector detects that the operation state is a subscriber line test state.

17. The power feeding system according to claim 16, wherein an alternating-current signal is applied to the subscriber line by the exchange equipment only in the communication state; and wherein the detector detects the absence of the alternating-current signal to determine that the operation state of the subscriber line is the test state.

18. The power feeding system according to claim 16, wherein the detector detects a voltage across the subscriber line to determine if the operation state is the subscriber line test state.

19. The power feeding system according to claim 16, wherein a signal including a time-varying component and a constant component is applied to the subscriber line by the exchange equipment only in the communication state; and wherein the detector comprises:

a first detection circuit for detecting the absence of the constant component to produce a first test state detection signal;

a second detection circuit for detecting the absence of the time-varying component to produce a second test state detection signal; and a combiner for combining the first and second test state detection signals to produce a control signal for the switch circuit.

20. The power feeding system according to claim 19, wherein the combiner comprises a logical OR circuit connected to the outputs of the first and second detection circuits.

21. A control method for a power feeding circuit which feeds D.C. power to a subscriber terminal over a subscriber line which connects the subscriber terminal to an exchange, the control method comprising the steps of:

a) detecting an operation state of the subscriber line connected to the exchange equipment;

b) supplying the D.C. power to the subscriber terminal through the subscriber line from a power supply circuit located between the exchange equipment and the subscriber terminal when the operation state is a communication state; and c) disconnecting the power supply from the subscriber line while leaving the exchange equipment connected to the subscriber terminal through the subscriber line when the operation state is a subscriber line test state.

22. The control method according to claim 21 in which the operation state is detected by monitoring a voltage across the subscriber line.

23. The control method according to claim 21 in which an alternating-current signal is applied to the subscriber line by the exchange equipment only when the operation state is a communication state, and wherein the operation state is detected by monitoring the subscriber line to detect the presence or absence of the alternating-current signal.

24. The control method according to claim 21 in which a signal including a time-varying component and a constant component is applied to the subscriber line by the exchange equipment only in the communication state; and wherein the step a) comprises:

detecting the absence ofthe constant component to produce a first test state detection signal;

detecting the absence of the time-varying component to produce a second test state detection signal; and combining the first and second test state detection signals to determine whether the operation state is the subscriber line test state.

* * * * *